(12) United States Patent
Kim

(10) Patent No.: US 12,430,259 B2
(45) Date of Patent: Sep. 30, 2025

(54) SYSTEM AND METHOD OF ADDRESS MAPPING FOR SAVING MEMORY MACRO ADDRESS BUS TOGGLE POWER

(71) Applicant: Samsung Electronics Co., Ltd., Gyeonggi-do (KR)

(72) Inventor: Jang Dae Kim, San Jose, CA (US)

(73) Assignee: Samsung Electronics Co., Ltd., Seoul (KR)

( * ) Notice: Subject to any disclaimer, the term of this patent is extended or adjusted under 35 U.S.C. 154(b) by 39 days.

(21) Appl. No.: 18/491,342

(22) Filed: Oct. 20, 2023

(65) Prior Publication Data

US 2024/0411699 A1 Dec. 12, 2024

Related U.S. Application Data

(60) Provisional application No. 63/507,618, filed on Jun. 12, 2023.

(51) Int. Cl.
*G06F 12/00* (2006.01)
*G06F 12/10* (2016.01)

(52) U.S. Cl.
CPC ...... *G06F 12/10* (2013.01); *G06F 2212/1028* (2013.01)

(58) Field of Classification Search
CPC ............. G06F 12/10; G06F 2212/1028; G06F 12/0292
USPC ........................................................ 711/104
See application file for complete search history.

(56) References Cited

U.S. PATENT DOCUMENTS

| 7,009,618 | B1 | 3/2006 | Brunner et al. |
| 7,788,619 | B2 | 8/2010 | Sim |
| 10,573,354 | B2 | 2/2020 | Iyer et al. |
| 11,586,727 | B2 | 2/2023 | Tsirkin |
| 2017/0132147 | A1* | 5/2017 | Loh ........................ G06F 12/084 |
| 2022/0027287 | A1 | 1/2022 | Sahita et al. |
| 2023/0091498 | A1 | 3/2023 | Raju et al. |
| 2023/0144693 | A1* | 5/2023 | Wang ................. G06F 12/0653 |

FOREIGN PATENT DOCUMENTS

| EP | 0321156 B1 * | 3/1998 | |
| WO | WO-2020162921 A1 * | 8/2020 | ......... B41J 2/04541 |
| WO | WO 2023/278925 | 1/2023 | |

* cited by examiner

*Primary Examiner* — Mardochee Chery
(74) *Attorney, Agent, or Firm* — The Farrell Law Firm, P.C.

(57) ABSTRACT

A memory device includes a first address mapper and a first memory macro connected to the first address mapper. The first address mapper is configured to determine if an input address falls within a first address range mapped to the first memory macro, in response to determining that the input address falls within the first address range mapped to the first memory macro, access the first memory macro with an address on an address bus of the first memory macro mapped from the input address, and in response to determining that the input address does not fall within the first address range mapped to the first memory macro, prevent access to the first memory macro and set the address bus of the first memory macro to a value that depends on whether the input address is lower or higher than the first address range.

22 Claims, 5 Drawing Sheets

- RA[0] VDDPE 0.00658
- RA[0] VDDCE 0.00382
- RA[1] VDDPE 0.00278
- RA[1] VDDCE 0.00000
- RA[2] VDDPE 0.00255
- RA[2] VDDCE 0.00000
- RA[3] VDDPE 0.00236
- RA[3] VDDCE 0.00000
- RA[4] VDDPE 0.00218
- RA[4] VDDCE 0.00000
- RA[5] VDDPE 0.00200
- RA[5] VDDCE 0.00000
- RA[6] VDDPE 0.00206
- RA[6] VDDCE 0.00000
- RA[7] VDDPE 0.00196
- RA[7] VDDCE 0.00000

FIG. 4

SYSTEM AND METHOD OF ADDRESS MAPPING FOR SAVING MEMORY MACRO ADDRESS BUS TOGGLE POWER

PRIORITY

This application is based on and claims priority under 35 U.S.C. § 119(e) to U.S. Provisional Patent Application Ser. No. 63/507,618, which was filed in the U.S. Patent and Trademark Office on Jun. 12, 2023, the entire content of which is incorporated herein by reference.

TECHNICAL AREA

The present disclosure relates generally to reducing power consumption in memory operations, and more particularly, to a system and method capable of mapping an input address to a corresponding memory macro address bus, which prevent toggling of the memory macro's address bus when the input address is outside an address range of the memory macro.

BACKGROUND

Large random-access memories (RAMs) generally consist of smaller RAMs, which may be referred to as memory macros, coupled in so called "glue" logic. The glue logic maps original input write/read address buses into each memory macro's write/read address buses (in simple arithmetic operations). The glue logic also provides write/read enable signals to each memory macro, based on the input write/read addresses. Additionally, the glue logic selects a data output from the memory macros using a multiplex (MUX) and the memory macros' read-enable signals with appropriate delay.

Memory macro address pin toggling is geometrical, e.g., 1+2+4+8+16+ . . . , in an incremental (or decremental) memory access pattern, e.g., first in, first out (FIFO) or stack. However, power is dissipated as each memory macro address bus is toggled.

Also, some address bits of memory macros use more (or less) toggling power per toggle than other address bits. For example, a most significant bit (MSB) is least toggled, and a least significant bit (LSB) is most toggled, the latter taking up 50% of all address bus toggles combined, often using more per-toggle power than the MSB.

Accordingly, a need exists for an improved system and method of mapping an input address bus to a corresponding memory macro address bus, which reduces toggling of the memory macro's address bus, thereby reducing power consumption.

SUMMARY

The present disclosure addresses at least the problems and/or disadvantages described above and provides at least the advantages described herein.

Accordingly, an aspect of the present disclosure is to provide a method in which, when an input address is outside an address range mapped to a memory macro, the input address may be mapped to the memory macro's address that prevents (or substantially reduces) the memory macro's address bus toggle as the input address re-enters the address range mapped to the memory macro in an incremental (or decremental) memory access pattern.

When the input address is within the address range mapped to the memory macro, the input address may be mapped to the memory macro's address that substantially reduces the memory macro's address bus toggling power for incremental (or decremental) memory access pattern.

Mapping of an input address bus to each memory macro's corresponding address bus may prevent toggling of the memory macro's address bus when the input address remains outside the address range mapped to the memory macro, thereby saving the wasted power.

Additionally, address mapping may also substantially reduce a memory macro's total address bus toggling power when the input address remains inside the address range mapped to the memory macro in an incremental memory access pattern.

According to an embodiment, a memory device is provided, which includes a first address mapper and a first memory macro connected to the first address mapper. The first address mapper is configured to determine if an input address falls within a first address range mapped to the first memory macro, in response to determining that the input address falls within the first address range mapped to the first memory macro, access the first memory macro with an address on an address bus of the first memory macro mapped from the input address, and in response to determining that the input address does not fall within the first address range mapped to the first memory macro, prevent access to the first memory macro and set the address bus of the first memory macro to a value that depends on whether the input address is lower or higher than the first address range.

According to an embodiment, a method performed by a memory device is provided. The method includes receiving, by the memory device, an input address; determining, by a first address mapper of the memory device connected to a first memory macro of the memory device, if the input address falls within a first address range mapped to the first memory macro; in response to determining that the input address falls within the first address range mapped to the first memory macro, accessing, by the first address mapper, the first memory macro with an address on an address bus of the first memory macro mapped from the input address; and in response to determining that the input address does not fall within the first address range mapped to the first memory macro, preventing access to the first memory macro and setting the address bus of the first memory macro to a value that depends on whether the input address is lower or higher than the first address range.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4 illustrates an example of different per-toggle power used at different address pins of a two-bank memory macro.

DETAILED DESCRIPTION

Figure 1:
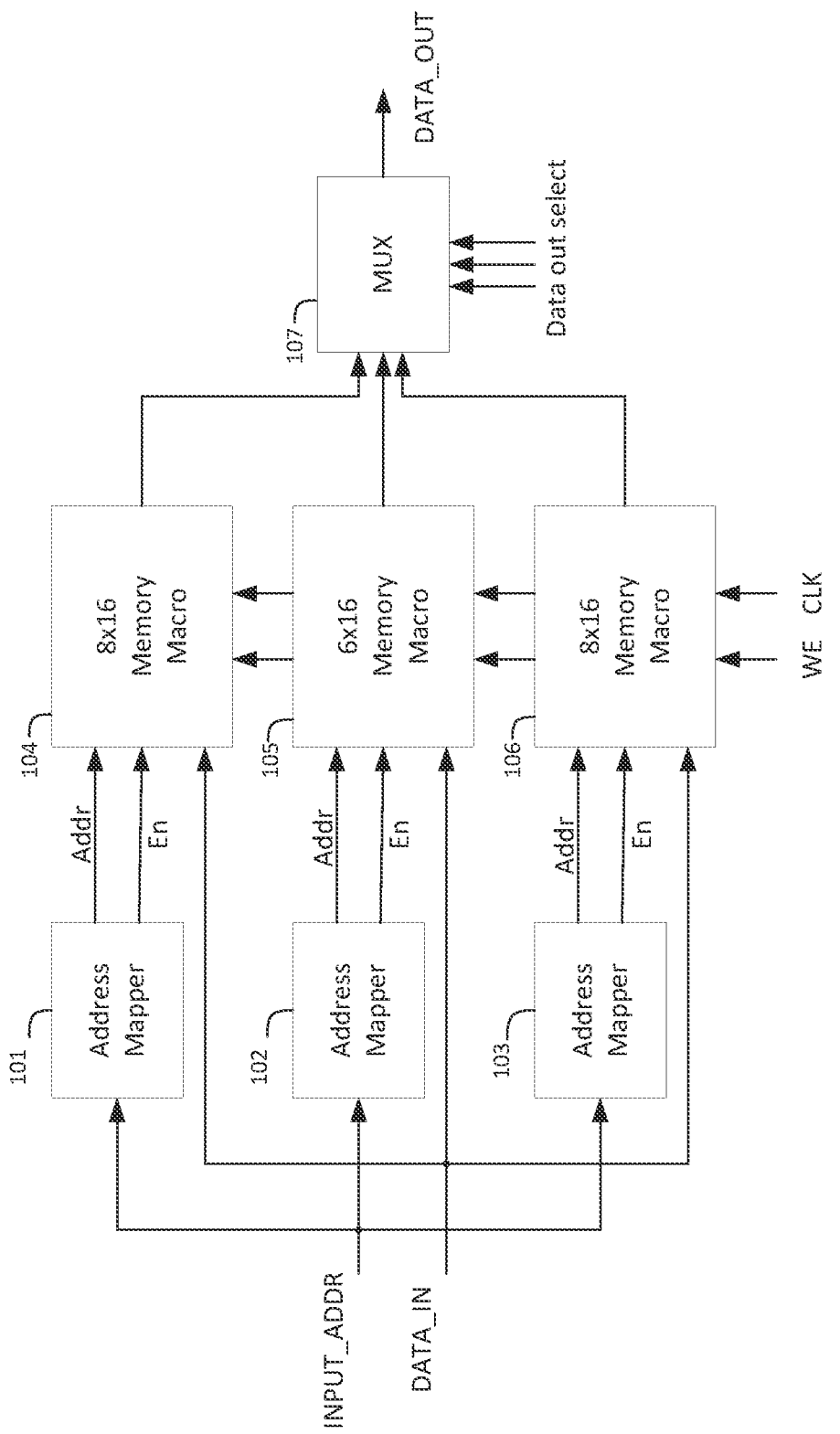
FIG. 1 illustrates a conventional single-port memory device.

Hereinafter, various embodiments of the disclosure are described in detail with reference to the accompanying drawings. The same elements may be designated by the same or similar reference numerals although they are shown in different drawings.

In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness.

The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items. Additionally, singular forms are intended to include plural forms unless the context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order).

If an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

The terms used herein are merely used to describe various embodiments of the present disclosure but are not intended to limit the present disclosure. In the present disclosure, the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device may be one of various types of electronic devices utilizing storage devices. The electronic device may use any suitable storage standard, such as, e.g., peripheral component interconnect express (PCIe), nonvolatile memory express (NVMe), NVMe-over-fabric (NVMeoF), advanced extensible interface (AXI), ultra-path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), etc., or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), etc., or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. The electronic devices may include, e.g., a portable communication device (e.g., a smart phone), a computer, a portable multimedia device, a portable medical device, a camera, a wearable device, or a home appliance. However, an electronic device is not limited to those described above.

As used herein, the term "module" may include a unit implemented in hardware, software, firmware, or combination thereof, and may interchangeably be used with other terms, for example, "logic." "logic block," "part." and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

As used herein, the term "parked" may be equivalent to "set". For example, "an address bus of a first memory macro is parked at a first value" is the same as saying "an address bus of a first memory macro is set to a first value".

As used herein, the term address "encoding" may refer to an operation on an address that results in change in a memory access pattern, and the term "logical" input address may refer to an input address in an original memory access pattern before any address encoding.

FIG. 1 illustrates a conventional single-port memory device.

Referring to FIG. 1, the memory device includes address mappers 101 to 103, memory macros 104 to 106, and a MUX 107.

The smaller memory macros 104 to 106 are coupled in a glue logic. An input address for the large memory is mapped by the glue logic to each memory macro's corresponding address. The glue logic also provides write/read enable signals to each memory macro, based on the input write/read addresses. Additionally, the glue logic selects a data output from the memory macros using a MUX 107 and the memory macros' read-enable signals with appropriate delay.

More specifically, in FIG. 1, the memory device is a 22×16 (22 words by 16 bits) memory device, which is implemented with 8×16, 6×16, and 8×16 memory macros 104, 105, and 106, respectively. Here, the 8×16, 6×16, and 8×16 memory macros may be referred to as a first macro 104, a second macro 105, and a third macro 106, respectively.

An input address bus for the 22×16 memory device has 5-bits, and has address space from decimal 0 to decimal 21. The smaller memory macros 104-106 have 3-bit address buses.

Table 1 below provides an example address mappings (without address bus gating) for the three memory macros 104 to 106 shown above.

TABLE 1

| Input address (in binary) | First macro's address | Second macro's address | Third macro's address |
|---|---|---|---|
| 0 (5'b00000) | 0 (3'b000) | 0 (1'b000) | 2 (3'b010) |
| 1 (5'b00001) | 1 (3'b001) | 1 (3'b001) | 3 (3'b011) |
| 2 (5'b00010) | 2 (3'b010) | 2 (3'b010) | 4 (3'b100) |
| 3 (5'b00011) | 3 (3'b011) | 3 (3'b011) | 5 (3'b101) |
| 4 (5'b00100) | 4 (3'b100) | 4 (3'b100) | 6 (3'b110) |
| 5 (5'b00101) | 5 (3'b101) | 5 (3'b101) | 7 (3'b111) |
| 6 (5'b00110) | 6 (3'b110) | 6 (3'b110) | 0 (1'b000) |
| 7 (5'b00111) | 7 (3'b111) | 7 (3'b111) | 1 (3'b001) |
| 8 (5'b01000) | 0 (3'b000) | 0 (1'b000) | 2 (3'b010) |
| 9 (5'b01001) | 1 (3'b001) | 1 (3'b001) | 3 (3'b011) |
| 10 (5'b01010) | 2 (3'b010) | 2 (3'b010) | 4 (3'b100) |
| 11 (5'b01011) | 3 (3'b011) | 3 (3'b011) | 5 (3'b101) |
| 12 (5'b01100) | 4 (3'b100) | 4 (3'b100) | 6 (3'b110) |
| 13 (5'b01101) | 5 (3'b101) | 5 (3'b101) | 7 (3'b111) |
| 14 (5'b01110) | 6 (3'b110) | 6 (3'b110) | 0 (1'b000) |
| 15 (5'b01111) | 7 (3'b111) | 7 (3'b111) | 1 (3'b001) |
| 16 (5'b10000) | 0 (3'b000) | 0 (1'b000) | 2 (3'b010) |
| 17 (5'b10001) | 1 (3'b001) | 1 (3'b001) | 3 (3'b011) |
| 18 (5'b10010) | 2 (3'b010) | 2 (3'b010) | 4 (3'b100) |
| 19 (5'b10011) | 3 (3'b011) | 3 (3'b011) | 5 (3'b101) |
| 20 (5'b10100) | 4 (3'b100) | 4 (3'b100) | 6 (3'b110) |
| 21 (5'b10101) | 5 (3'b101) | 5 (3'b101) | 7 (3'b111) |

As shown above in Table 1, mapped address bits for the first macro 104 are the same as lower 3 bits of the input address bus. That is, the mapped address bits for the first macro 104 correspond to decimal values 0 to 7 of the input address, using the lower 3 bits.

The mapped address bits for the second macro 105 correspond to decimal values 8-13 of the input address. Thus, the mapped address bits for the second macro 105 are the same as that of the first macro 104.

The mapped address bits for the third macro 106 correspond to decimal values 14 to 21 of the input address.

Accordingly, the address mapper 101 accesses the first memory macro 104 for input addresses from decimal 0 (5'b00000) to decimal 7 (5'b00111), the address mapper 102 accesses the second memory macro 105 for input addresses from decimal 8 (5'b01000) to decimal 13 (5'b01101), and the address mapper 103 accesses the third memory macro 106 for input addresses from decimal 14 (5'b01110) to decimal 21 (5'b10101).

Mapped addresses for the memory macros 104 to 106, when not accessed, are functionally immaterial. For example, the mapped addresses for the memory macro 104 correspond to input addresses from decimal 0 (5'b00000) to decimal 7 (5'b00111). The memory macro 104 is not accessed for input addresses from decimal 8 (5'b01000) to decimal 21 (5'b10101). Accordingly, the values therein are functionally immaterial.

However, as described above, toggling of the address bus of memory macro 104 still occurs, even though the values therein are functionally immaterial. Further, the memory macro's address bus toggling burns pin power even if its write/read enable is de-asserted, inefficiently utilizing power.

To address these types of problems, various embodiments of the disclosure provide a system and method which prevent memory macro address bus toggling when its write/read enable is de-asserted.

Figure 2:
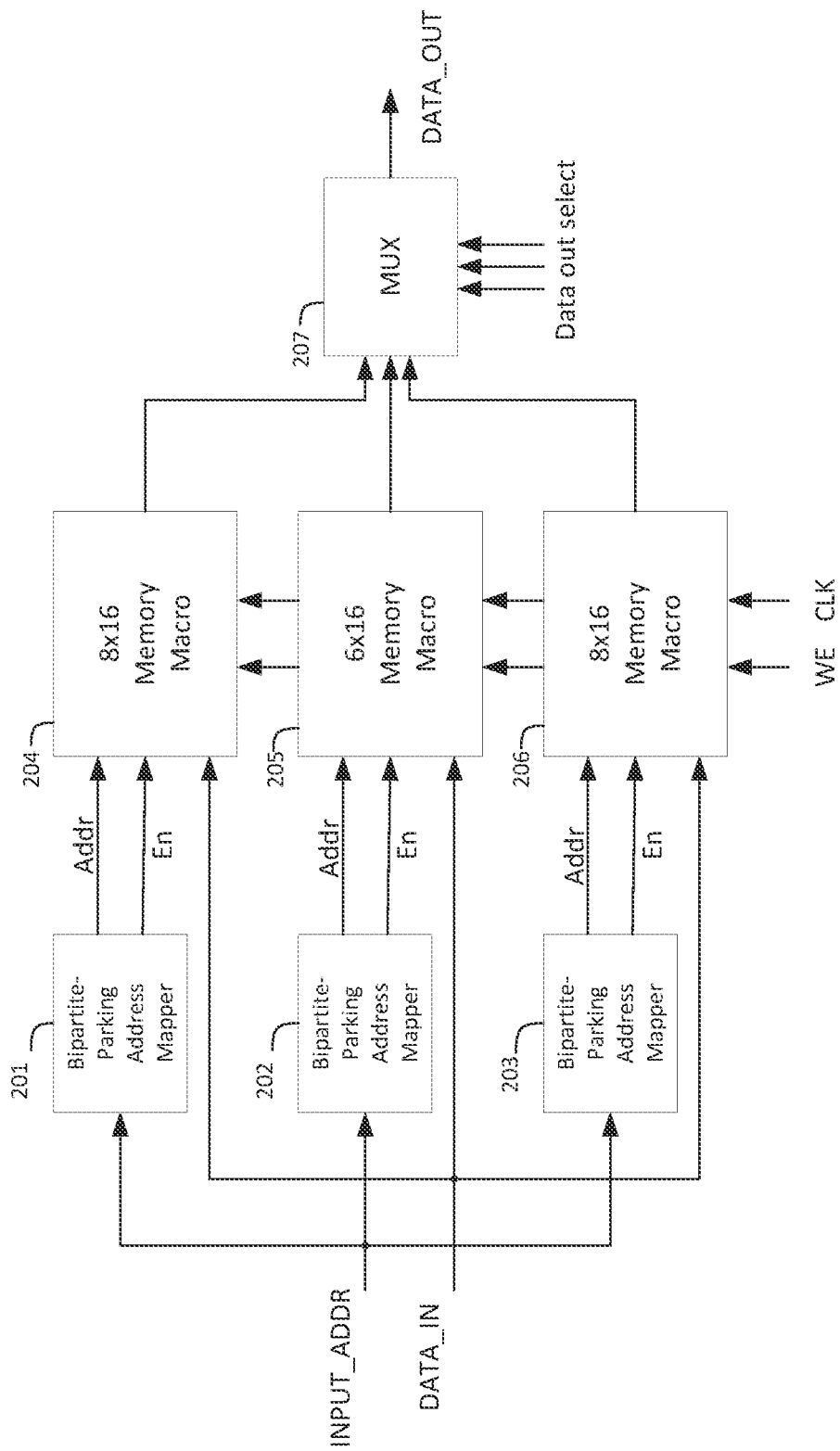
FIG. 2 illustrates a single-port memory device, according to an embodiment.

FIG. 2 illustrates a single-port memory device, according to an embodiment.

Referring to FIG. 2, the memory device includes bipartite-parking address mappers 201 to 203, memory macros 204 to 206, and a MUX 207.

Similar to FIG. 1, the smaller memory macros 204 to 206 are coupled in a glue logic. An input address for the large memory is mapped by the glue logic to each memory macro's corresponding address. The glue logic also provides write/read enable signals to each memory macro, based on the input write/read addresses. Additionally, the glue logic selects a data output from the memory macros using the MUX 207 and the memory macros' read-enable signals with appropriate delay.

More specifically, in FIG. 2, the memory device is a 22×16 (22 words by 16 bits) memory device, which is implemented with 8×16, 6×16, and 8×16 memory macros 204, 205, and 206, respectively. Here, the 8×16, 6×16, and 8×16 memory macros may be referred to as a first macro 204, a second macro 205, and a third macro 206, respectively.

An input address bus for the 22×16 memory device has 5-bits, and has address space from decimal 0 to decimal 21. The smaller memory macros 204-206 have 3-bit address buses.

Unlike the address mappers 101 to 103, each of the bipartite-parking address mappers 201 to 203 may determine if an input address falls within a mapped address range of corresponding memory macros 204 to 206 and map differently, if it is determined that the input address falls outside the mapped address range. Here, the first macro 204 has a mapped address range from decimal 0 (5'b00000) to decimal 7 (5'b00111), the second macro 205 has a mapped address range from decimal 8 (5'b01000) to decimal 13 (5'b01101), and the third macro 206 has a mapped address range from decimal 14 (5'b01110) to decimal 21 (5'b10101).

In accordance with an embodiment of the disclosure, address mappings for the three memory macros 204 to 206 are shown in Table 2 below.

TABLE 2

| Input address (in binary) | First macro's address | Second macro's address | Third macro's address |
|---|---|---|---|
| 0 (5'b00000) | 0 (3'b000) | 0 (1'b000) | 0 (1'b000) |
| 1 (5'b00001) | 1 (3'b001) | 0 (1'b000) | 0 (1'b000) |
| 2 (5'b00010) | 2 (3'b010) | 0 (1'b000) | 0 (1'b000) |
| 3 (5'b00011) | 3 (3'b011) | 0 (1'b000) | 0 (1'b000) |
| 4 (5'b00100) | 4 (3'b100) | 0 (1'b000) | 0 (1'b000) |
| 5 (5'b00101) | 5 (3'b101) | 0 (1'b000) | 0 (1'b000) |
| 6 (5'b00110) | 6 (3'b110) | 0 (1'b000) | 0 (1'b000) |
| 7 (5'b00111) | 7 (3'b111) | 0 (1'b000) | 0 (1'b000) |
| 8 (5'b01000) | 7 (3'b111) | 0 (1'b000) | 0 (1'b000) |
| 9 (5'b01001) | 7 (3'b111) | 1 (3'b001) | 0 (1'b000) |
| 10 (5'b01010) | 7 (3'b111) | 2 (3'b010) | 0 (1'b000) |
| 11 (5'b01011) | 7 (3'b111) | 3 (3'b011) | 0 (1'b000) |
| 12 (5'b01100) | 7 (3'b111) | 4 (3'b100) | 0 (1'b000) |
| 13 (5'b01101) | 7 (3'b111) | 5 (3'b101) | 0 (1'b000) |

TABLE 2-continued

| Input address (in binary) | First macro's address | Second macro's address | Third macro's address |
| --- | --- | --- | --- |
| 14 (5'b01110) | 7 (3'b111) | 5 (3'b101) | 0 (1'b000) |
| 15 (5'b01111) | 7 (3'b111) | 5 (3'b101) | 1 (3'b001) |
| 16 (5'b10000) | 7 (3'b111) | 5 (3'b101) | 2 (3'b010) |
| 17 (5'b10001) | 7 (3'b111) | 5 (3'b101) | 3 (3'b011) |
| 18 (5'b10010) | 7 (3'b111) | 5 (3'b101) | 4 (3'b100) |
| 19 (5'b10011) | 7 (3'b111) | 5 (3'b101) | 5 (3'b101) |
| 20 (5'b10100) | 7 (3'b111) | 5 (3'b101) | 6 (3'b110) |
| 21 (5'b10101) | 7 (3'b111) | 5 (3'b101) | 7 (3'b111) |

As shown above in Table 2, for input addresses from decimal 0 (5'b00000) to decimal 7 (5'b00111), the first macro 204 is accessed with mapped addresses from decimal 0 (3'b000) to decimal 7 (3'b111). For these same input addresses, which are outside of the respective address ranges of the second and third macros 205 and 206, the second and third macros 205 and 206 are not accessed and their addresses remain mapped to decimal 0 (3'b000). That is, the bipartite-parking address mappers 202 and 203 determine that the input addresses from decimal 0 (5'b00000) to decimal 7 (5'b00111) are not within the respective address ranges of the second and third macros 205 and 206, and the second and third macros 205 and 206 are not accessed and their corresponding addresses remain mapped to decimal 0 (3'b000). Accordingly, address bus toggling for the second and third macros 205 and 206 is prevented for these input addresses.

Herein, accessing and not accessing (or preventing access) may be controlled using an enabling signal (En), e.g., set to "1" or "0" for a respective control.

For input addresses from decimal 8 (5'b01000) to decimal 13 (5'b01101), the second macro 205 is accessed with mapped addresses from decimal 0 (3'b000) to decimal 5 (3'b101). For these same input addresses, which are outside of the respective address ranges of the first and third macros 204 and 206, the first and third macros 204 and 206 are not accessed and their corresponding addresses are mapped to decimal 7 (3'b111) and decimal 0 (3'b000), respectively. That is, the bipartite-parking address mappers 201 and 203 determine that the input addresses from decimal 8 (5'b01000) to decimal 13 (5'b01101) are not within the respective address ranges of the first and third macros 204 and 206, and the first and third macros 204 and 206 are not accessed and their corresponding addresses remain mapped to decimal 7 (3'b111) and decimal 0 (3'b000), respectively. Accordingly, address bus toggling for the first and third macros 204 and 206 is prevented for these input addresses.

For input addresses from decimal 14 (5'b01110) to decimal 21 (5'b10101), the third macro 206 is accessed with mapped addresses from 0 (3'b000) to 7 (3'b111). For these same input addresses, which are outside of the respective address ranges of the first and second macros 204 and 205, the first and second macros 204 and 205 are not accessed and their corresponding addresses are mapped to decimal 7 (3'b111) and decimal 5 (3'b101), respectively. That is, the bipartite-parking address mappers 201 and 203 determine that the input addresses from decimal 14 (5'b01110) to decimal 21 (5'b10101) are not within the respective address ranges of the first and third macros 204 and 206, and the first and second macros 204 and 205 are not accessed and their corresponding addresses remain mapped to decimal 7 (3'b111) and decimal 5 (3'b101), respectively. Accordingly, address bus toggling for the first and second macros 204 and 205 is prevented for these input addresses.

As shown above, when the input address changes between decimal 7 (5'b00111) and decimal 8 (5'b01000), address buses of the first, second, and third macros 204, 205, and 206 remain unchanged at decimal 7 (3'b111), 0 (3'b000), and 0 (3'b000), respectively. Similarly, when the input address changes between decimal 13 (5'b01101) and 14 (5'b01110), address buses of the first, second, and third macros 204, 205, and 206 remain unchanged at decimal 7 (3'b111), 5 (3'b101), and 0 (3'b000) respectively. That is, corresponding address buses of all memory macros remain unchanged (i.e., a Hamming distance 0) when the input address changes across memory macros in an incremental memory access pattern. Alternatively, these mapped values could be different as long as the Hamming distance is smaller than a corresponding memory macro's address bus width.

As shown above, the mapped addresses of memory macros that are not accessed remain unchanged in the incremental memory access pattern.

For logical addresses on an input address bus lower than an address range mapped to a memory macro, the corresponding memory macro's address bus is parked at a first mapped address corresponding to a lowest logical address in the address range mapped to the memory macro. For example, for logical addresses on an input address bus lower than decimal 8 (5'b01000), the address bus of the second macro 205 is parked at decimal 0 (1'b000).

For logical addresses on the input address bus higher than the address range mapped to the memory macro, the corresponding memory macro's address bus is parked at a second mapped address corresponding to a highest logical address in the address range mapped to the memory macro. For example, for logical addresses on an input address bus higher than decimal 13 (5'b01101), the address bus of the second macro 205 is parked at decimal 5 (3'b101).

When a memory macro is not accessed in an incremental memory access pattern, mapped address bus bits are not toggling, preventing unnecessary power consumption. When a memory macro is re-entered in an incremental memory access pattern, mapped address bus bits are not toggling, preventing unnecessary power consumption.

Although FIG. 2 illustrates a memory device including 3 bipartite-parking address mappers and 3 corresponding memory macros, the disclosure is not limited thereto. For example, a memory device according to an embodiment may include 2 bipartite-parking address mappers and 2 corresponding memory macros or may include 4 or more bipartite-parking address mappers and 4 or more corresponding memory macros.

Additionally, although FIG. 2 is described above with reference to Table 2, which utilizes an incremental memory access pattern, a memory device according to an embodiment may also utilize a decremental memory access pattern.

Figure 3:
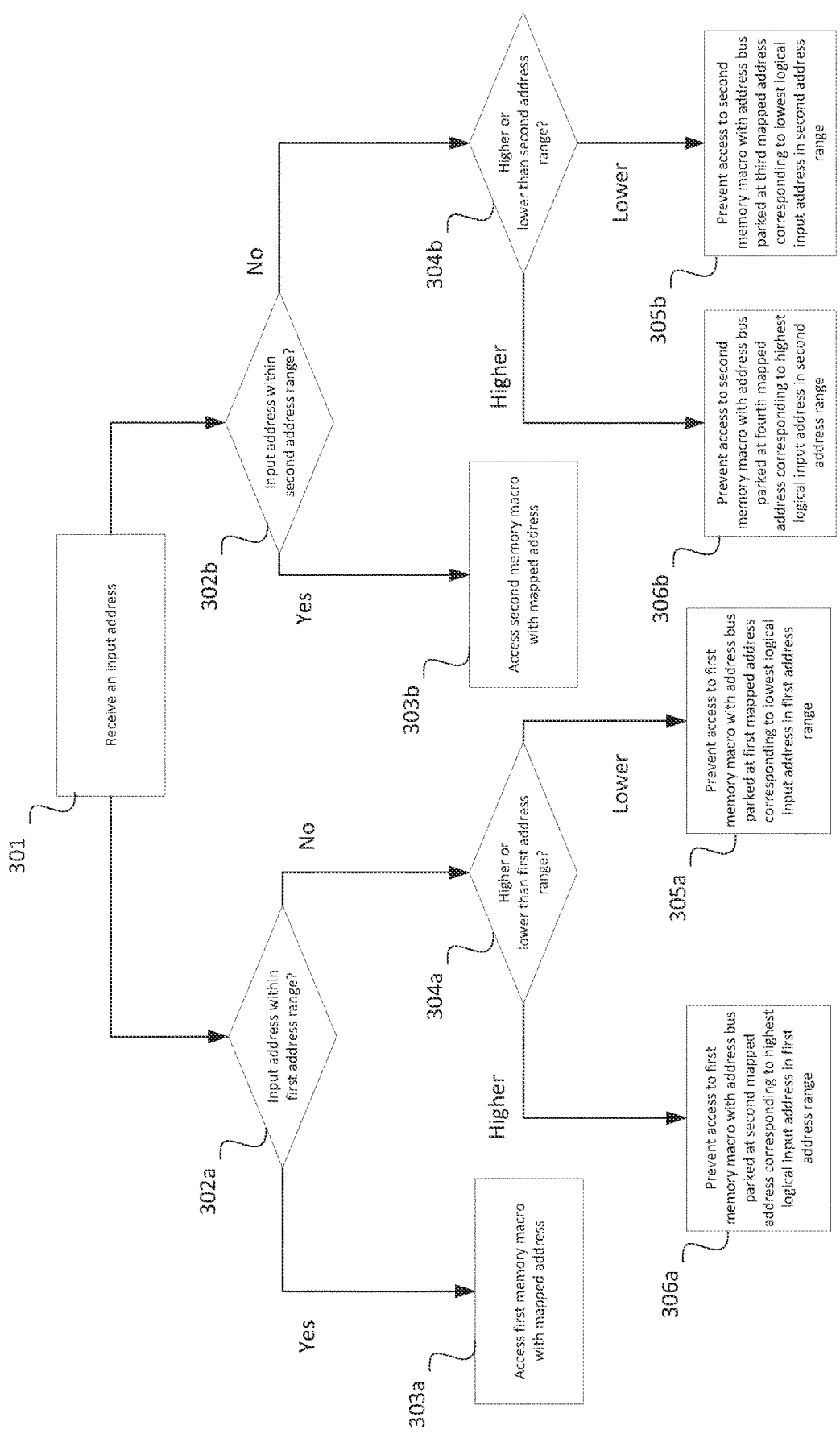
FIG. 3 is a flow chart illustrating an operating method of a memory device, according to an embodiment.

FIG. 3 is a flow chart illustrating an operating method of a memory device, according to an embodiment.

Referring to FIG. 3, in step 301, the memory device, which includes a first bipartite-parking address mapper, a first memory macro connected to the first bipartite-parking address mapper, a second bipartite-parking address mapper, and a second memory macro connected to the second bipartite-parking address mapper, receives an input address.

In step 302a, the first bipartite-parking address mapper determines if the input address falls within a first address range mapped to the first memory macro.

In step 303a, in response to determining that the input address falls within the first address range mapped to the first memory macro, the first bipartite-parking address mapper accesses the first memory macro with the input address mapped to an address bus of the first memory macro.

In step 304a, in response to determining that the input address does not fall within the first address range mapped to the first memory macro, the first bipartite-parking address mapper determines whether the input address is higher or lower than the first address range mapped to the first memory macro.

In step 305a, in response to determining that the input address is lower than the first address range mapped to the first memory macro, the first bipartite-parking address mapper prevents access to the first memory macro with the address bus of the first memory macro parked at a first mapped address corresponding to a lowest logical input address in the first address range mapped to the first memory macro.

In step 306a, in response to determining that the input address is higher than the first address range mapped to the first memory macro, the first bipartite-parking address mapper prevents access to the first memory macro with the address bus of the first memory macro parked at a second mapped address corresponding to a highest logical input address in the first address range mapped to the first memory macro.

In step 302b, the second bipartite-parking address mapper determines if the input address falls within a second address range mapped to the second memory macro.

In step 303b, in response to determining that the input address falls within the second address range mapped to the second memory macro, the second bipartite-parking address mapper accesses the second memory macro with the input address mapped to an address bus of the second memory macro.

In step 304b, in response to determining that the input address does not fall within the second address range mapped to the second memory macro, the second bipartite-parking address mapper determines whether the input address is higher or lower than the second address range mapped to the second memory macro.

In step 305b, in response to determining that the input address is lower than the second address range mapped to the second memory macro, the second bipartite-parking address mapper prevents access to the second memory macro with the address bus of the second memory macro parked at a third mapped address corresponding to a lowest logical input address in the second address range mapped to the second memory macro.

In step 306b, in response to determining that the input address is higher than the second address range mapped to the second memory macro, the second bipartite-parking address mapper prevents access to the second memory macro with the address bus of the second memory macro parked at a fourth mapped address corresponding to a highest logical input address in the second address range mapped to the second memory macro.

As described above, power consumption may be reduced by utilizing bipartite-parking address mappers to prevent access to corresponding memory macros and to keep their addresses mapped to a particular value, when an input address is not within an address range of a particular memory macro.

Additionally, power consumption may be further reduced by applying certain encoding methods within the memory macros. More specifically, various encoding methods may be applied within the memory macros to further reduce toggling.

FIG. 4 illustrates an example of different per-toggle power used at different address pins of a two-bank memory macro.

As illustrated in FIG. 4, based on different toggling rates and different per-toggle power, the different pins do not experience the same power consumption.

For example, in two-bank memory macros, power consumption of a pin corresponding to an MSB is about ⅕ of an LSB, and in four-bank memory macros, pins corresponding to the most-significant two bits are generally lighter in per-toggle power consumption than the others.

Generally, an LSB of each memory macro is toggling the most.

In accordance with an embodiment of the disclosure, subset encoding of address buses that are fully decoded may be used to reduce such toggling, e.g., with an array of exclusive-OR gates, for a memory macro that has power-of-two words.

More specifically, for a memory macro with an integer multiple (x, where x is greater than or equal to 1) of power-of-two ($2^n$) actual addressable entries (i.e., rows or words), address mapping may include encoding the least-significant n bits of the write address bus and corresponding encoding of least-significant n bits of the read address bus. For example, for 384 actual entries ($3*(2^7)$), where x=3 and n=7, the lower 7 bits may be encoded. In binary representation of the size of a memory macro, the number of trailing 0's is n, and the memory macro's address bits corresponding to the trailing 0's (i.e., least-significant n bits) are fully decoded, identifying the subset for encoding.

As described above, memory macros often have even number of words and an LSB of such memory macros often have highest pin power per toggle. For such cases, Gray encoding may be partially employed in a subset of address buses. That is, for a memory macro with an even number of actual addressable entries (e.g., an integer multiple of $2^1$ entries), the subset encoding may include Gray encoding on the least-significant two bits of both write and read address buses. Gray encoding of least-significant two bits changes the LSB only.

Examples of address mappings employing Gray encoding to the least-significant two bits of such memory macro's address buses, in accordance with an embodiment of the disclosure (hereinafter referred to as partial Gray (or LSB Gray) encoding), are shown in Table 3 below for the three memory macros.

TABLE 3

| Input address (in binary) | First macro's address | Second macro's address | Third macro's address |
| --- | --- | --- | --- |
| 0 (5'b00000) | 0 (3'b000) | 0 (1'b000) | 0 (1'b000) |
| 1 (5'b00001) | 1 (3'b001) | 0 (1'b000) | 0 (1'b000) |
| 2 (5'b00010) | 3 (3'b011) | 0 (1'b000) | 0 (1'b000) |
| 3 (5'b00011) | 2 (3'b010) | 0 (1'b000) | 0 (1'b000) |
| 4 (5'b00100) | 4 (3'b100) | 0 (1'b000) | 0 (1'b000) |
| 5 (5'b00101) | 5 (3'b101) | 0 (1'b000) | 0 (1'b000) |
| 6 (5'b00110) | 7 (3'b111) | 0 (1'b000) | 0 (1'b000) |
| 7 (5'b00111) | 6 (3'b110) | 0 (1'b000) | 0 (1'b000) |
| 8 (5'b01000) | 6 (3'b110) | 0 (1'b000) | 0 (1'b000) |
| 9 (5'b01001) | 6 (3'b110) | 1 (3'b001) | 0 (1'b000) |
| 10 (5'b01010) | 6 (3'b110) | 3 (3'b011) | 0 (1'b000) |
| 11 (5'b01011) | 6 (3'b110) | 2 (3'b010) | 0 (1'b000) |
| 12 (5'b01100) | 6 (3'b110) | 4 (3'b100) | 0 (1'b000) |
| 13 (5'b01101) | 6 (3'b110) | 5 (3'b101) | 0 (1'b000) |
| 14 (5'b01110) | 6 (3'b110) | 5 (3'b101) | 0 (1'b000) |
| 15 (5'b01111) | 6 (3'b110) | 5 (3'b101) | 1 (3'b001) |
| 16 (5'b10000) | 6 (3'b110) | 5 (3'b101) | 3 (3'b011) |
| 17 (5'b10001) | 6 (3'b110) | 5 (3'b101) | 2 (3'b010) |
| 18 (5'b10010) | 6 (3'b110) | 5 (3'b101) | 4 (3'b100) |

TABLE 3-continued

| Input address (in binary) | First macro's address | Second macro's address | Third macro's address |
| --- | --- | --- | --- |
| 19 (5'b10011) | 6 (3'b110) | 5 (3'b101) | 5 (3'b101) |
| 20 (5'b10100) | 6 (3'b110) | 5 (3'b101) | 7 (3'b111) |
| 21 (5'b10101) | 6 (3'b110) | 5 (3'b101) | 6 (3'b110) |

The partial Gray ending reduces LSB toggling frequency in half at the cost of an exclusive-OR gate for each memory macro's address buses. As LSB toggling may account for about 50% of all toggling and its pin power per toggle is often heaviest among the address bus, total address bus toggle power saving may be more than 25%.

Memory macros are often symmetrical in design and an MSB of the address buses is often lightest in pin power per toggle. In accordance with an embodiment of the disclosure, for memory macros with power-of-two entries (or words), the memory macro's address bits may be shuffled to reduce total address bus toggle power.

More specially, for a fully decoded memory macro with power-of-two actual addressable entries (i.e., $2^n$ entries), the subset encoding may incorporate shuffling (or swapping) of write address bus bits, including MSBs and LSBs, and corresponding shuffling (or swapping) of read address bus bits.

Examples of address mappings by swapping an MSB and an LSB of such memory macro's address buses, in accordance with an embodiment of the disclosure, on top of the LSB Gray encoding, are shown below in Table 4 for the three memory macros.

TABLE 4

| Input address (in binary) | First macro's address | Second macro's address | Third macro's address |
| --- | --- | --- | --- |
| 0 (5'b00000) | 0 (3'b000) | 0 (1'b000) | 0 (1'b000) |
| 1 (5'b00001) | 4 (3'b100) | 0 (1'b000) | 0 (1'b000) |
| 2 (5'b00010) | 6 (3'b110) | 0 (1'b000) | 0 (1'b000) |
| 3 (5'b00011) | 2 (3'b010) | 0 (1'b000) | 0 (1'b000) |
| 4 (5'b00100) | 1 (3'b001) | 0 (1'b000) | 0 (1'b000) |
| 5 (5'b00101) | 5 (3'b101) | 0 (1'b000) | 0 (1'b000) |
| 6 (5'b00110) | 7 (3'b111) | 0 (1'b000) | 0 (1'b000) |
| 7 (5'b00111) | 3 (3'b011) | 0 (1'b000) | 0 (1'b000) |
| 8 (5'b01000) | 3 (3'b011) | 0 (1'b000) | 0 (1'b000) |
| 9 (5'b01001) | 3 (3'b011) | 1 (3'b001) | 0 (1'b000) |
| 10 (5'b01010) | 3 (3'b011) | 3 (3'b011) | 0 (1'b000) |
| 11 (5'b01011) | 3 (3'b011) | 2 (3'b010) | 0 (1'b000) |
| 12 (5'b01100) | 3 (3'b011) | 4 (3'b100) | 0 (1'b000) |
| 13 (5'b01101) | 3 (3'b011) | 5 (3'b101) | 0 (1'b000) |
| 14 (5'b01110) | 3 (3'b011) | 5 (3'b101) | 0 (1'b000) |
| 15 (5'b01111) | 3 (3'b011) | 5 (3'b101) | 4 (3'b100) |
| 16 (5'b10000) | 3 (3'b011) | 5 (3'b101) | 6 (3'b110) |
| 17 (5'b10001) | 3 (3'b011) | 5 (3'b101) | 2 (3'b010) |
| 18 (5'b10010) | 3 (3'b011) | 5 (3'b101) | 1 (3'b001) |
| 19 (5'b10011) | 3 (3'b011) | 5 (3'b101) | 5 (3'b101) |
| 20 (5'b10100) | 3 (3'b011) | 5 (3'b101) | 7 (3'b111) |
| 21 (5'b10101) | 3 (3'b011) | 5 (3'b101) | 3 (3'b011) |

As shown in Table 4, only the first and third memory macros have power-of-two words, and therefore, MSB-LSB swapping is applied on them. After the bit swapping, an LSB (which is normally heaviest in pin power per toggle) is least toggled and an MSB (which is normally lightest in pin power per toggle) is most toggled, thereby saving total address bus toggling power beyond LSB Gray coding.

MSB-LSB swapping cannot be applied on the second memory macro. For example, if applied on the second memory macro, its mapped address 5 (3'b110) for input address 10 (5'b01010) would be out-of-range.

In accordance with an embodiment of the disclosure, conditional address encoding (including bit-swapping) may be applied on memory macros that are not power-of-two.

More specifically, for a memory macro with less than power-of-two actual addressable entries (i.e., rows or words), the address mapping may further include a conditional encoding of write address bus bits, excluding its MSB, when the MSB is 1'b0, and a corresponding conditional encoding of read address bus bits. The conditional encoding may include address bit shuffling (or swapping) of a memory macro's address buses, excluding MSB, only when MSB is 1'b0.

Examples of address mappings, in accordance with an embodiment of the disclosure, for the three memory macros are shown in Table 5.

TABLE 5

| Input address (in binary) | First macro's address | Second macro's address | Third macro's address |
| --- | --- | --- | --- |
| 0 (5'b00000) | 0 (3'b000) | 0 (1'b000) | 0 (1'b000) |
| 1 (5'b00001) | 4 (3'b100) | 0 (1'b000) | 0 (1'b000) |
| 2 (5'b00010) | 2 (3'b010) | 0 (1'b000) | 0 (1'b000) |
| 3 (5'b00011) | 6 (3'b110) | 0 (1'b000) | 0 (1'b000) |
| 4 (5'b00100) | 1 (3'b001) | 0 (1'b000) | 0 (1'b000) |
| 5 (5'b00101) | 5 (3'b101) | 0 (1'b000) | 0 (1'b000) |
| 6 (5'b00110) | 3 (3'b011) | 0 (1'b000) | 0 (1'b000) |
| 7 (5'b00111) | 7 (3'b111) | 0 (1'b000) | 0 (1'b000) |
| 8 (5'b01000) | 7 (3'b111) | 0 (1'b000) | 0 (1'b000) |
| 9 (5'b01001) | 7 (3'b111) | 2 (3'b010) | 0 (1'b000) |
| 10 (5'b01010) | 7 (3'b111) | 1 (3'b001) | 0 (1'b000) |
| 11 (5'b01011) | 7 (3'b111) | 3 (3'b011) | 0 (1'b000) |
| 12 (5'b01100) | 7 (3'b111) | 4 (3'b100) | 0 (1'b000) |
| 13 (5'b01101) | 7 (3'b111) | 5 (3'b101) | 0 (1'b000) |
| 14 (5'b01110) | 7 (3'b111) | 5 (3'b101) | 0 (1'b000) |
| 15 (5'b01111) | 7 (3'b111) | 5 (3'b101) | 4 (3'b100) |
| 16 (5'b10000) | 7 (3'b111) | 5 (3'b101) | 2 (3'b010) |
| 17 (5'b10001) | 7 (3'b111) | 5 (3'b101) | 6 (3'b110) |
| 18 (5'b10010) | 7 (3'b111) | 5 (3'b101) | 1 (3'b001) |
| 19 (5'b10011) | 7 (3'b111) | 5 (3'b101) | 5 (3'b101) |
| 20 (5'b10100) | 7 (3'b111) | 5 (3'b101) | 3 (3'b011) |
| 21 (5'b10101) | 7 (3'b111) | 5 (3'b101) | 7 (3'b111) |

As shown in Table 5, MSB-LSB swapping is applied on the first and third memory macros' address buses as described above. However, for the second memory macro, an LSB and a next LSB are swapped conditionally when the MSB is 0. For memory macros of any size, the subset of words whose MSB is 0 is power-of-two, if the MSB is excluded. That is, any address encoding including bit-shuffling is feasible if applied conditionally when the MSB, which is excluded from the encoding, is 0. As the LSB and the next LSB are swapped for the second memory macro, the most toggled bit in the incremental memory access pattern is moved away from the LSB that is often heaviest in pin power per toggle.

For a memory macro with less than power-of-two actual addressable entries (i.e., rows or words), address mapping may include a subset encoding on least-significant m bits of write and read address buses when their respective MSB is 1'b1, if the number of remaining addressable entries (i.e., rows) with their MSB being 1'b1 is an integer multiple of $2^n$.

For a memory macro with less than power-of-two actual addressable entries (i.e., rows or words) and the number of addressable entries (i.e., rows) under their MSB being 1'b1 also less than power-of-two ($2^m$) but greater than $2^{m-1}$, address mapping may include a subset encoding on the least-significant m bits of write and read address buses, excluding their MSB and bit[m], when their respective MSB and bit[m] are 1'b1 and 1'b0, respectively.

For a memory macro with less than power-of-two actual addressable entries (i.e., rows or words) and the number of addressable entries (i.e., rows) under their MSB being 1'b1 also less than power-of-two ($2^m$) but greater than $2^{m-1}$, address mapping may include a subset encoding on least-significant n bits of write and read address buses when their respective MSB and bit[m] are 1'b1 if the number of remaining addressable rows with the MSB and bit[m] being 1'b1 is an integer multiple of $2^n$.

As described above, in accordance with the above-described embodiments, bipartite-parking address mapping may be performed on all memory macros' address buses with one or more optional address bus encodings, i.e., LSB Gray encoding on address buses of memory macros that have even number of actual addressable entries, address bit swapping of most significant two address bits and least-significant two address bits on power-of-two rows memory macros that have four memory banks selected by most-significant two address bits, or MSB-LSB address bit swapping on power-of-two rows memory macros that have two memory banks selected by MSB.

Figure 5:
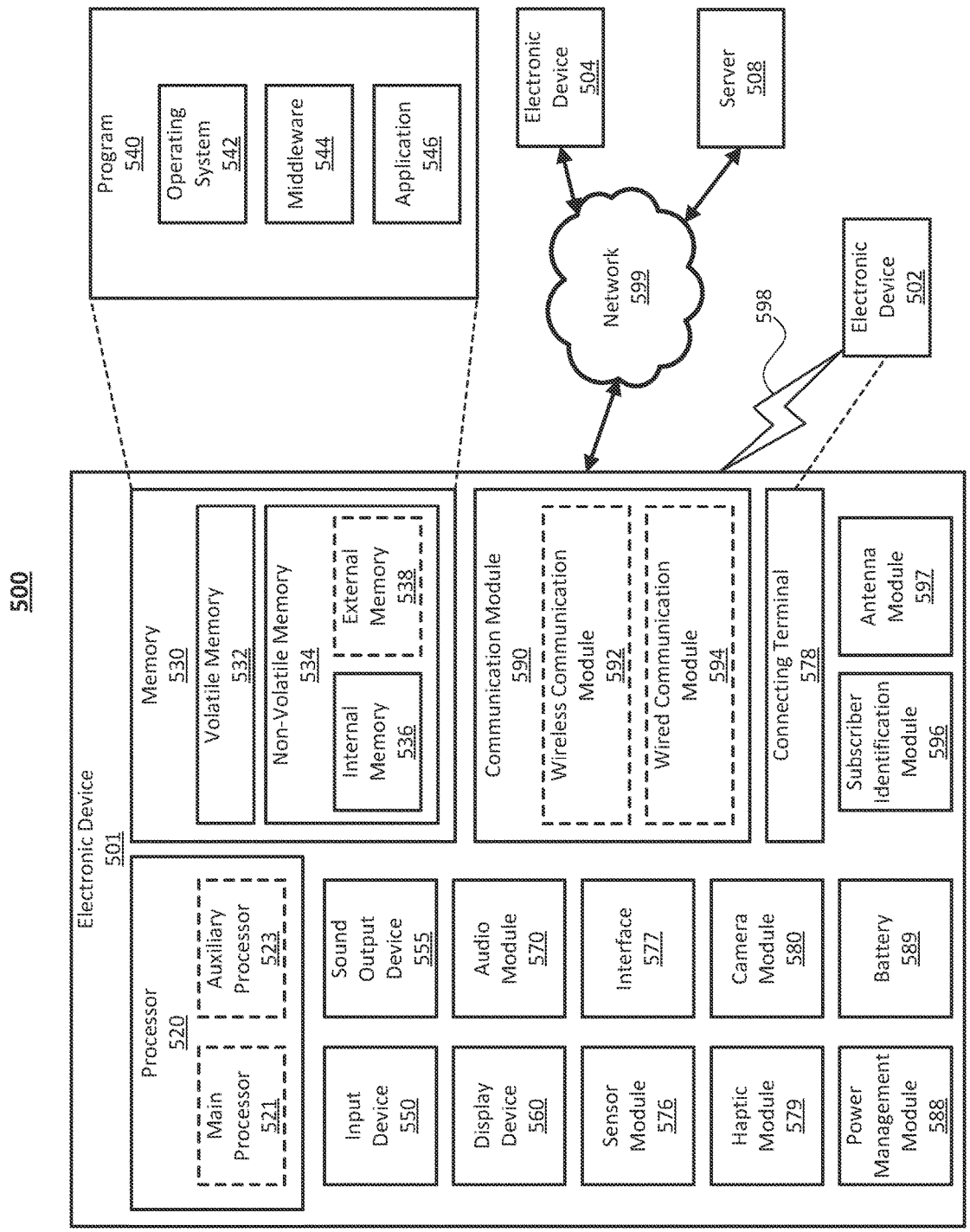
FIG. 5 illustrates a block diagram of an electronic device in a network environment, according to an embodiment.

FIG. 5 illustrates an electronic device in a network environment, according to an embodiment.

Referring to FIG. X, the electronic device 501, e.g., a mobile terminal including GPS functionality, in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597 including a global navigation satellite system (GNSS) antenna. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations.

As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a CPU or an application processor, and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an ISP or a CP) may be implemented as part of another component (e.g., the camera module 580 or the communication module 590) functionally related to the auxiliary processor 523.

The memory 530, e.g., a memory device as illustrated in FIG. 2, may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wiredly) or wirelessly. According to one embodiment, the interface 577 may include, for example, a high-definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, ISPs, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more CPs that are operable independently from the processor 520 (e.g., the application processor) and supports a direct (e.g., wired) communication or a wireless communication. According to one embodiment, the communication module 590 may include a wireless communication module 592 (e.g., a cellular communication module, a short-range wireless communication module, or a GNSS communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the SIM 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations, e.g., as illustrated in the flowcharts, performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A memory device, comprising:
a first address mapper; and
a first memory macro connected to the first address mapper,
wherein the first address mapper is configured to:
determine if an input address falls within a first address range mapped to the first memory macro,
in response to determining that the input address falls within the first address range mapped to the first memory macro, access the first memory macro with an address on an address bus of the first memory macro mapped from the input address, and
in response to determining that the input address does not fall within the first address range mapped to the first memory macro, prevent access to the first memory macro and set the address bus of the first memory macro to a value that depends on whether the input address is lower or higher than the first address range.

2. The memory device of claim 1, wherein the first address mapper is further configured to set the address bus of the first memory macro to the value by:
parking the address bus of the first memory macro at a first value, when the input address is below the first address range mapped to the first memory macro, and
parking the address bus of the first memory macro at a second value, when the input address is higher than the first address range mapped to the first memory macro.

3. The memory device of claim 2, wherein the first value includes a first mapped value on the address bus of the first memory macro corresponding to a lowest logical input address in the first address range, and
wherein the second value includes a second mapped value on the address bus of the first memory macro corresponding to a highest logical input address in the first address range.

4. The memory device of claim 2, wherein a first Hamming distance between the first value and a first mapped value on the address bus of the first memory macro corresponding a lowest logical input address in the first address range is less than an address bus size of the address bus, and
wherein a second Hamming distance between the second value and a second mapped value on the address bus of the first memory macro corresponding a highest logical input address in the first address range is less than the address bus size of the address bus.

5. The memory device of claim 1, wherein the first memory macro includes $x*2^n$ addressable entries, where x is a first integer greater than or equal to 1 and n is a second integer greater than or equal to 1,
wherein the first address mapper is further configured to encode at least one of a write address or a read address corresponding to the input address, and
wherein only least significant n bits of the at least one of the write address or the read address are affected by the encoding.

6. The memory device of claim 1, wherein the first memory macro includes $x*2^n$ addressable entries, where x is a first integer greater than or equal to 1 and n is a second integer greater than or equal to 1, and
wherein the first address mapper is further configured to perform Gray encoding on a subset of least significant n+1 bits of at least one of a write address or a read address corresponding to the input address.

7. The memory device of claim 1, wherein the first memory macro includes an even number of addressable entries, and
wherein the first address mapper is further configured to perform Gray encoding on least significant two bits of at least one of a write address or a read address corresponding to the input address.

8. The memory device of claim 1, wherein the first memory macro includes $x*2^n$ addressable entries, where x is a first integer greater than or equal to 1 and n is a second integer greater than or equal to 1, and
wherein the first address mapper is further configured to shuffle a subset of least significant n bits of at least one of a write address or a read address corresponding to the input address.

9. The memory device of claim 1, wherein the first memory macro includes $x*2^n$ addressable entries, where x is a first integer greater than or equal to 1 and n is a second integer greater than or equal to 1, and
wherein the first address mapper is further configured to swap a first least significant bit and a $n^{th}$ least significant bit of at least one of a write address or a read address corresponding to the input address.

10. The memory device of claim 1, wherein a number of addressable entries included in the first memory macro is less than $2^n$ and greater than $2^{n-1}$, where n is an integer greater than or equal to 1, wherein the first address mapper is further configured to perform a conditional encoding on at least one of a write address or a read address corresponding to the input address, when a most significant bit (MSB) is 0, and wherein only least significant n−1 bits of the at least one of the write address or the read address are affected by the conditional encoding.

11. The memory device of claim 10, wherein the conditional encoding comprises conditional shuffling of bits of the at least one of the write address or the read address, excluding the MSB, when the MSB is 0.

12. The memory device of claim 1, wherein a number of addressable entries included in the first memory macro is greater than $x*2^m+2^n$ and less than $2^{n+1}$, where x is a first integer greater than or equal to 1, m is a second integer greater than or equal to 1, and n is a third integer greater than m, wherein the first address mapper is further configured to perform a conditional encoding on bits at least one of a write address or read address of the first memory macro, when a most significant bit (MSB) of the at least one of the write address or the read address is 1, and wherein only least significant m bits of the at least one of the write address or the read address are affected by the conditional encoding.

13. The memory device of claim 1, wherein a number of addressable entries included in the first memory macro is less than $2^m+2^n$ and greater than $2^{m-1}+2^n$, where m is a first integer greater than or equal to 1 and n is a second integer greater than m, and wherein the first address mapper is further configured to perform a conditional encoding on bits of at least one of a write address or a read address, when a most significant bit and an $m^{th}$ least significant bit are 1 and 0, respectively, and wherein only least significant m−1 bits of the at least one of the write address or the read address are affected by the conditional encoding.

14. The memory device of claim 2, further comprising:
a second address mapper; and
a second memory macro connected to the first address mapper,
wherein the second address mapper is configured to:
determine if the input address falls within a second address range mapped to the second memory macro,
in response to determining that the input address falls within the second address range mapped to the second memory macro, access the second memory macro with an address on an address bus of the second memory macro mapped from the input address, and
in response to determining that the input address does not fall within the second address range mapped to the second memory macro:
prevent access to the second memory macro, with the address bus of the second memory macro parked at a third value, when the input address is below the second address range mapped to the second memory macro, and
prevent access to the second memory macro, with the address bus of the second memory macro parked at a fourth value, when the input address is higher than the second address range mapped to the second memory macro.

15. The memory device of claim 14, wherein the third value includes a third mapped value on the address bus of the second memory macro corresponding to a lowest logical input address in the second address range, and wherein the fourth value includes a fourth mapped value on the address bus of the second memory macro corresponding to a highest logical input address in the second address range.

16. The memory device of claim 14, wherein a third Hamming distance between the third value and a third mapped value on the address bus of the second memory macro corresponding a lowest logical input address in the second address range is less than an address bus size of the address bus of the second memory macro, and wherein a fourth Hamming distance between the fourth value and a fourth mapped value on the address bus of the second memory macro corresponding a highest logical input address in the second address range is less than the address bus size of the address bus of the second memory macro.

17. The memory device of claim 14, wherein the second memory macro includes $x*2^n$ addressable entries, where x is a first integer greater than or equal to 1 and n is a second integer greater than or equal to 1, and wherein the second address mapper is further configured to encode at least one of a write address or a read address corresponding to the input address, and wherein only least significant n bits of the at least one of the write address or the read address are affected by the encoding.

18. The memory device of claim 14, wherein the second memory macro includes $x*2^n$ addressable entries, where x is a first integer greater than or equal to 1 and n is a second integer greater than or equal to 1, and wherein the second address mapper is further configured to perform Gray encoding on a subset of least significant n+1 bits of at least one of a write address or a read address corresponding to the input address.

19. A method of a memory device, the method comprising:
receiving, by the memory device, an input address;
determining, by a first address mapper of the memory device connected to a first memory macro of the memory device, if the input address falls within a first address range mapped to the first memory macro; and
performing at least one of:
in response to determining that the input address falls within the first address range mapped to the first memory macro, accessing, by the first address mapper, the first memory macro with an address on an address bus of the first memory macro mapped from the input address; or
in response to determining that the input address does not fall within the first address range mapped to the first memory macro, preventing access to the first memory macro and setting the address bus of the first memory macro to a value that depends on whether the input address is lower or higher than the first address range.

20. The method of claim 19, wherein setting the address bus of the first memory macro to the value comprises performing at least one of:
parking the address bus of the first memory macro at a first value, when the input address is below the first address range mapped to the first memory macro, or
parking the address bus of the first memory macro at a second value, when the input address is higher than the first address range mapped to the first memory macro.

21. The method of claim 20, wherein the first value includes a first mapped value on the address bus of the first memory macro corresponding to a lowest logical input address in the first address range, and wherein the second value includes a second mapped value on the address bus of the first memory macro corresponding to a highest logical input address in the first address range.

22. The method of claim 20, wherein the first memory macro includes $x*2^n$ addressable entries, where x is a first integer greater than or equal to 1 and n is a second integer greater than or equal to 1, and the method further comprising performing, by the first address mapper, Gray encoding on a subset of least significant n+1 bits of at least one of a write address or a read address corresponding to the input address.

\* \* \* \* \*